United States Patent Office 3,632,861
Patented Jan. 4, 1972

3,632,861
VINYL ESTER RESINS FROM EPOXIDES AND ISOMERIZED HYDROXY ALKYL ACRYLATES-MALEIC ANHYDRIDE REACTION PRODUCT
Sampse R. Hargis, Jr., Brazoria, Tex., assignor to The Dow Chemical Company, Midland, Mich.
No Drawing. Filed Mar. 19, 1969, Ser. No. 808,691
Int. Cl. C08g 45/04
U.S. Cl. 260—837 R          21 Claims

ABSTRACT OF THE DISCLOSURE

Improved heat distortion temperatures are obtained from vinyl ester resins prepared from an unsaturated dicarboxylic acid half ester of a hydroxyalkyl acrylate which is reacted with a polyepoxide or a melamine resin. The improvement results from isomerizing at least about 30 mole percent of said half ester to the trans form before reaction with said polyepoxide, etc.

BACKGROUND OF THE INVENTION

This invention relates to vinyl ester resins having improved heat distortion properties and a process for making the resins. In particular it relates to improved resins of the type disclosed in U.S. 3,367,992 by C. R. Bearden. According to said patent a half ester is first prepared by reacting a hydroxyalkyl ester of acrylic or methacrylic acid with a dicarboxylic acid anhydride followed by reaction of the acid group of the half ester with a polyepoxide resin, melamine resins and the like. While the vinyl ester resins so produced may be used to produce articles having excellent physical properties, the heat deformation properties have not been high enough to allow the resin to be used in certain application areas such as reinforced plastic pipe for transporting very hot fluids, for example. Some improvement can be made by the proper choice of a polyepoxide resin but other factors limit the value of this approach.

SUMMARY OF THE INVENTION

Vinyl ester resins with improved heat deformation properties are obtained by first isomerizing at least about 30 mole percent of an unsaturated dicarboxylic acid half ester of a hydroxyalkyl acrylate or methacrylate from the cis to the trans form and then reacting said half ester in essentially equivalent proportions with a polyepoxide or a melamine resin. Advantageously, the heat deformation temperature increases as the percent conversion to the trans form increases. The half ester is isomerized by heating the cis form of said half ester in an acidic medium. The invention encompasses both the resins and the process by which they are made.

DETAILED DESCRIPTION OF THE INVENTION

The half esters of this invention are conveniently made by reacting a hydroxyalkyl ester of acrylic or methacrylic acid with an unsaturated dicarboxylic acid anhydride. Normally, the cis form of the half ester is produced thereby and this is confirmed by nuclear magnetic resonance analysis. The cis and trans forms of said half ester are shown below

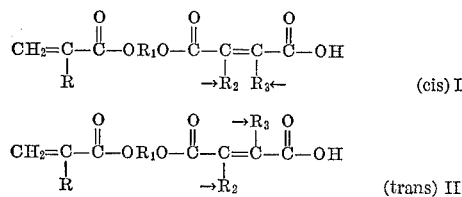

(the small arrows indicate the cis and transpositions). In the formulas R is hydrogen or methyl, $R_1$ is a divalent alkyl chain of 2 to 6 carbon atoms and $R_2$ and $R_3$ each may be H, methyl, ethyl, chloro, bromo or phenyl. In order to obtain the improvements of this invention the half ester must consist of at least 30 mole percent in the trans configuration.

Isomerization of the half ester from the cis to the trans form is readily accomplished by heating said half ester under acidic conditions for as little as a few seconds of time. The time of heating will vary depending on the degree of conversion desired and the conditions of temperature and acidity selected, but is readily determined with only routine experimentation. While the isomerization takes place at lower temperatures, a temperature range of about 80° to 150° C. is preferred. For rapid isomerization it is desirable to control the acidity to a pH of about 2 or below. For this purpose a variety of acidic materials may be used and include mineral acids such as HCl, HBr, $HNO_3$, $H_3PO_4$ and the like, and Lewis acids such as $PCl_3$, $POCl_3$, etc.

In essence the process of this invention comprises 1) isomerizing a half ester having a formula and a cis steric configuration according to Formula I until at least 30 mole percent of said half ester is converted into the trans configuration (Formula II), and 2) reacting the free acid group of said isomerized half ester with essentially an equivalent amount of a polyepoxide or a melamine resin. Except for the isomerization reaction the preparation of the half ester and the resins from the half esters are fully described and disclosed in U.S. 3,367,992 and are included herein by reference.

Briefly, any of the known polyepoxides may be employed in the preparation of the vinyl ester resins of this invention. Useful polyepoxides are glycidyl polyethers of both polyhydric alcohols and polyhydric phenols, flame retardant epoxy resins based on tetrabromo bisphenol A, epoxy novolacs, epoxidized diolefins, epoxidized diunsaturated acid esters as well as epoxidized unsaturated polyesters, so long as they contain more than one oxirane group per molecule. The polyepoxides may be monomeric or polymeric.

Preferred polyepoxides are glycidyl polyethers of polyhydric alcohols or polyhydric phenols having weight per epoxide group of about 150 to 2000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group per molecule, i.e., a 1,2-epoxy equivalency greater than one.

In place of the polyepoxide resin, one may use melamine resins which include aldehyde reaction products of melamine and alcohol modified aldehyde reaction products, such as hexamethylol melamine, hexamethylethers of hexamethylol melamine and the like. Also contemplated are those resins which are partially alcohol modified.

Generally the polyepoxide or melamine resin is reacted in about equivalent proportions with the half ester, although modest deviations from equivalency are permissible. The reaction conditions are adequately disclosed in U.S. 3,367,992.

The vinyl ester resins may be utilized, as prepared but usually the resin is admixed with a polymerizable monomer for reason of economics and to provide a range of cured properties. Additional valuable changes in properties may be obtained by incorporating with the resin any of a variety of known inert filler materials.

A variety of copolymerizable monomers are available and suitable and include alkenyl aromatic monomers, alkyl esters of acrylic and methacrylic acid, vinyl acetate, acrylonitrile, diallyl maleate, acrylic and methacrylic acid, vinyl chloride, acrylonitrile, and the like. Preferred are the alkenyl aromatic monomers such as styrene, α-methyl styrene, vinyl toluene, alkyl substituted styrenes such as t-butyl styrene, etc., halogen substituted styrenes such as chlorostyrene and the like.

The vinyl ester resins may be readily cured by exposure to ionizing radiation or by incorporation therein of free radical initiating catalysts and accelerating the cure by heating. Curing temperatures up to about 150° C. or even higher may be used. A variety of peroxide, persulfate and like catalysts are well known for this purpose.

The improved vinyl ester resins of this invention have heat distortion temperatures in the range of 190 to 256° F. as compared to a range of 152 to 210° F. for similar resins prepared without the isomerized half ester.

The following non-limiting examples are presented to further illustrate this invention.

EXAMPLE 1

A vinyl ester resin (Resin A) was prepared according to U.S. 3,367,992 by reacting together 15 lbs. of hydroxyethyl acrylate and 12.6 lbs. of maleic anhydride with 5.7 gm. of hydroquinone present until the percent acid was 21.3%. Then 42.4 lbs. of a diglycidyl ether of tetrabromo bisphenol A (D.E.R. 542) was added along with 48 mls. of DMP–30 catalyst [tri(dimethylaminomethyl)phenol] and reacted until the acid content reached 1.5%. After cooling to 70° C., 29 lbs. of vinyl toluene monomer was blended with the resin.

To illustrate the improvement in heat distortion obtainable by this invention a vinyl ester resin (Resin B) was prepared by placing 642 gms. of a half ester of hydroxyethyl acrylate and maleic anhydride in a suitable reactor and adding thereto 20 mls. of 36% HCl and raising the temperature to 120° C. The isomerization was practically instantaneous and the water was then removed by reducing the pressure to 60 mm. of Hg for 4 minutes. The isomerized half ester (about 71 mole percent by analysis) was then reacted with 990 gms. of D.E.R. 542 and 2 mls. of DMP–30. The mixture was allowed to react for 4 hours at 110° C. until the acid content was 2.2%, cooled and then blended with 678 gms. of vinyl toluene to give a resin of about 70% solids, similar to Resin A.

Cured specimens were prepared from each resin by adding 3 gms. of benzoyl peroxide to 300 gms. of resin and curing for 16 hours at 80° C. and then for 45 minutes at 138° C. The mold was 12" x 12" x ⅛".

| Physical properties | Resin B | Resin A |
| --- | --- | --- |
| Heat distortion temperature,[1] ° F. | 225 | 188 |
| Flexural strength, p.s.i. | 14,400 | 17,800 |
| Tensile strength, p.s.i. | 8,500 | 12,000 |
| Flexural modulus, ×10⁵ p.s.i. | 5.05 | 5.49 |
| Elongation, percent | 2.32 | 3.6 |

[1] ASTM D 1525–58T.

EXAMPLES 2–5

A series of vinyl ester resins were prepared from half esters which had been isomerized to varying degrees. The resins were prepared similar to that of Resin B in Example 1 except that D.E.R. 542 was replaced by an equivalent amount of a diglycidyl ether of bisphenol A (D.E.R. 331) and the amount of HCl was progressively increased as shown below. Styrene was also used in place of vinyl toluene.

| | Gms. of 36% HCl | Percent Trans | Heat dist. temp.[1] ° F. |
| --- | --- | --- | --- |
| Example 2 | 15 | 42 | 192 |
| Example 3 | 20 | 73 | 226 |
| Example 4 | 25 | 81.5 | 235 |
| Example 5 | 35 | ~100 | 256 |

[1] Determined on specimens cured with 1% benzoyl peroxide similar to Example 1.

EXAMPLE 6

A resin was prepared similar to that of Example 2, except that the concentrated aqueous HCl was replaced with PCl₃, a Lewis acid. The following ingredients were used: 642 gms. of a half ester of hydroxyethyl acrylate and maleic anhydride, 0.3 gm. of hydroquinone and 2.04 gms. of PCl₃; then 570 gms. D.E.R. 331, 1.42 gms. DMP–30 and 519 gms. of styrene.

With this amount of PCl₃ the half ester was 50% isomerized and a cured specimen had a HDT of 210° F. In another test the above materials in the same amounts were used except that the amount of PCl₃ was doubled to 4.08 gms. The cured resin had a HDT of 206° F.

The vinyl ester resins of this invention are especially valuable in the preparation of reinforced plastic articles designed for high temperature service such as pipe, duct work and the like. Said resins advantageously may contain inert fillers such as silica, clay, CaCO₃ and the like; pigments and colorants; reinforcing materials such as glass fibers, asbestos fibers and other types of thermoplastic fibers; mold release agents; and the like.

What is claimed is:

1. In a process for making vinyl ester resins wherein a half ester having essentially a cis configuration and the formula

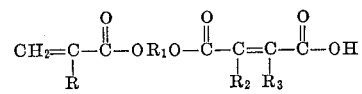

is reacted in essentially equivalent amounts with a polyepoxide resin having more than one epoxide group per molecule and wherein in said formula R is hydrogen or methyl, R₁ is a bivalent alkyl chain of 2 to 6 carbon atoms and R₂ and R₃ each may be hydrogen, methyl, ethyl, chloro, bromo or phenyl, the improvement which comprises heating said half ester under acidic conditions for a time sufficient to isomerize at least about 30 mole percent of said half ester to the trans configuration.

2. The process of claim 1 wherein said half ester essentially in the cis form is prepared by reacting about equimolar proportions of a hydroxyalkyl ester of acrylic or methacrylic acid with an unsaturated dicarboxylic acid anhydride.

3. The process of claim 2 wherein said half ester is prepared by reacting hydroxyethyl acrylate or methacrylate with maleic anhydride.

4. The process of claim 1 wherein said half ester is reacted with a glycidyl polyether of a polyhydric alcohol or a polyhydric phenol.

5. The process of claim 1 further comprising the step of blending a polymerizable ethylenically unsaturated compound with said resin.

6. The process of claim 1 wherein said isomerization is conducted at about 100° to 150° C.

7. The process of claim 1 wherein said half ester is isomerized by heating with HCl or PCl₃.

8. A thermosettable vinyl resin prepared according to the process of claim 1.

9. A thermosettable vinyl ester resin prepared according to the process of claim 2.

10. A thermosettable vinyl ester resin prepared according to the process of claim 3.

11. A thermosettable vinyl ester resin prepared according to the process of claim 4.

12. A thermosettable vinyl ester resin prepared according to the process of claim 5.

13. A thermosettable vinyl ester resin prepared according to the process of claim 6.

14. A thermosettable vinyl ester resin prepared according to the process of claim 7.

15. Thermoset articles having improved heat distortion temperatures comprising the cured resin of claim 8.

16. Thermoset articles having improved distortion temperatures comprising the cured resin of claim 9.

17. Thermoset articles having improved heat distortion temperatures comprising the cured resin of claim 10.

18. Thermoset articles having improved heat distortion temperatures comprising the cured resin of claim 11.

19. Thermoset articles having improved heat distortion temperatures comprising the cured resin of claim 12.

20. Thermoset articles having improved heat distortion temperatures comprising the cured resin of claim 13.

21. Thermoset articles having improved heat distortion temperatures comprising the cured resin of claim 14.

References Cited

UNITED STATES PATENTS

| | | | |
|---|---|---|---|
| 3,466,259 | 9/1969 | Jernigan | 260—837 |
| 3,506,736 | 4/1970 | Najvar | 260—836 |
| 3,150,118 | 9/1964 | Clemens | 260—78.5 |
| 3,367,992 | 2/1968 | Bearden | 260—837 |

OTHER REFERENCES

Ellis II—"The Chemistry of Petroleum Derivatives," The Chemical Catalog Co. Inc. N.Y. 1934, page 918.

PAUL LIEBERMAN, Primary Examiner

U.S. Cl. X.R.

260—37 Ep; 78.5 BB; 78.5 R, 836, 851